Nov. 17, 1970  F. E. MEHR  3,540,327
SPINDLE-LESS LATHE

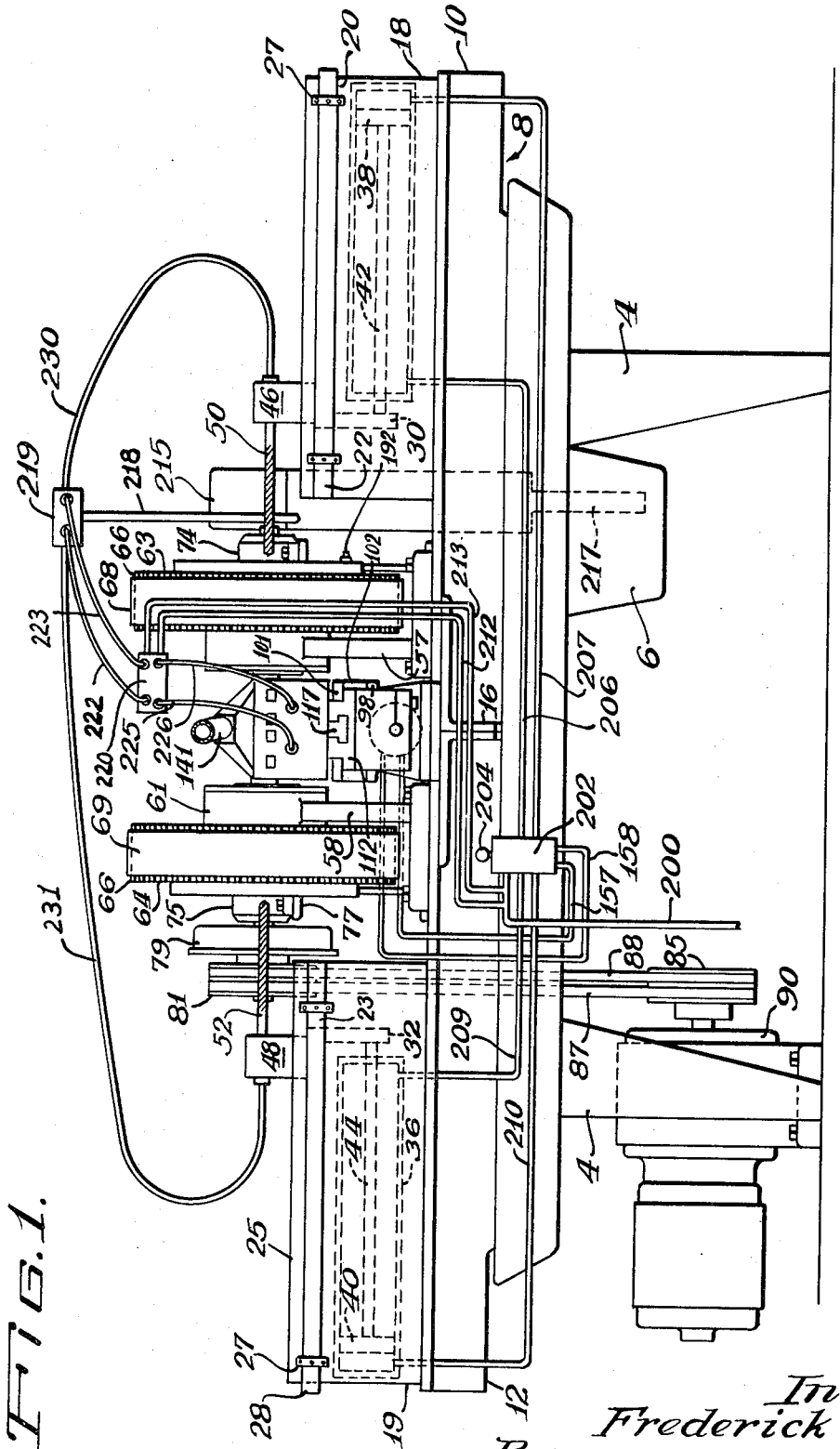

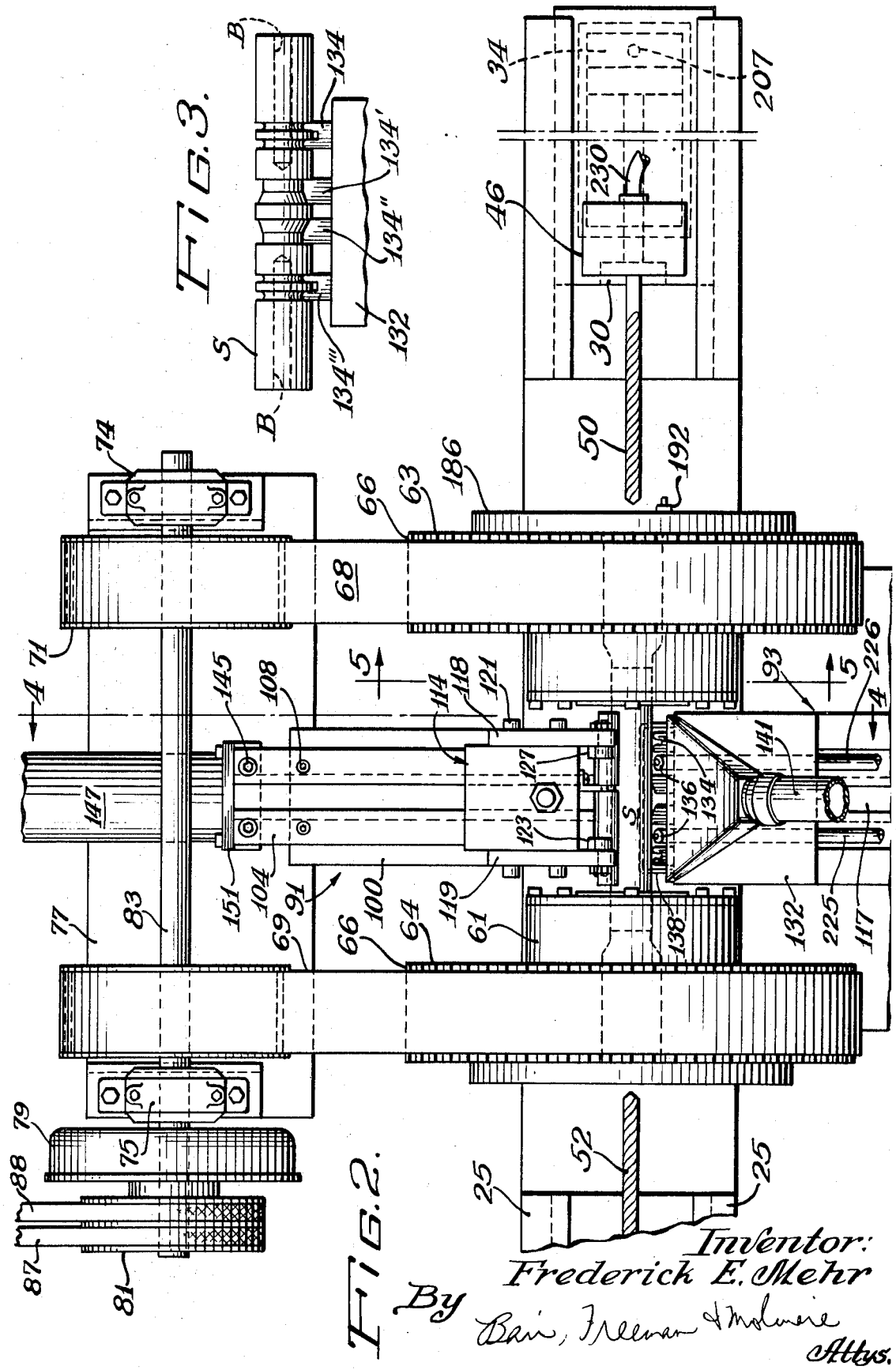

Filed Nov. 1, 1967  4 Sheets-Sheet 3

Inventor:
Frederick E. Mehr
By Ben, Freeman & Molinare Attys.

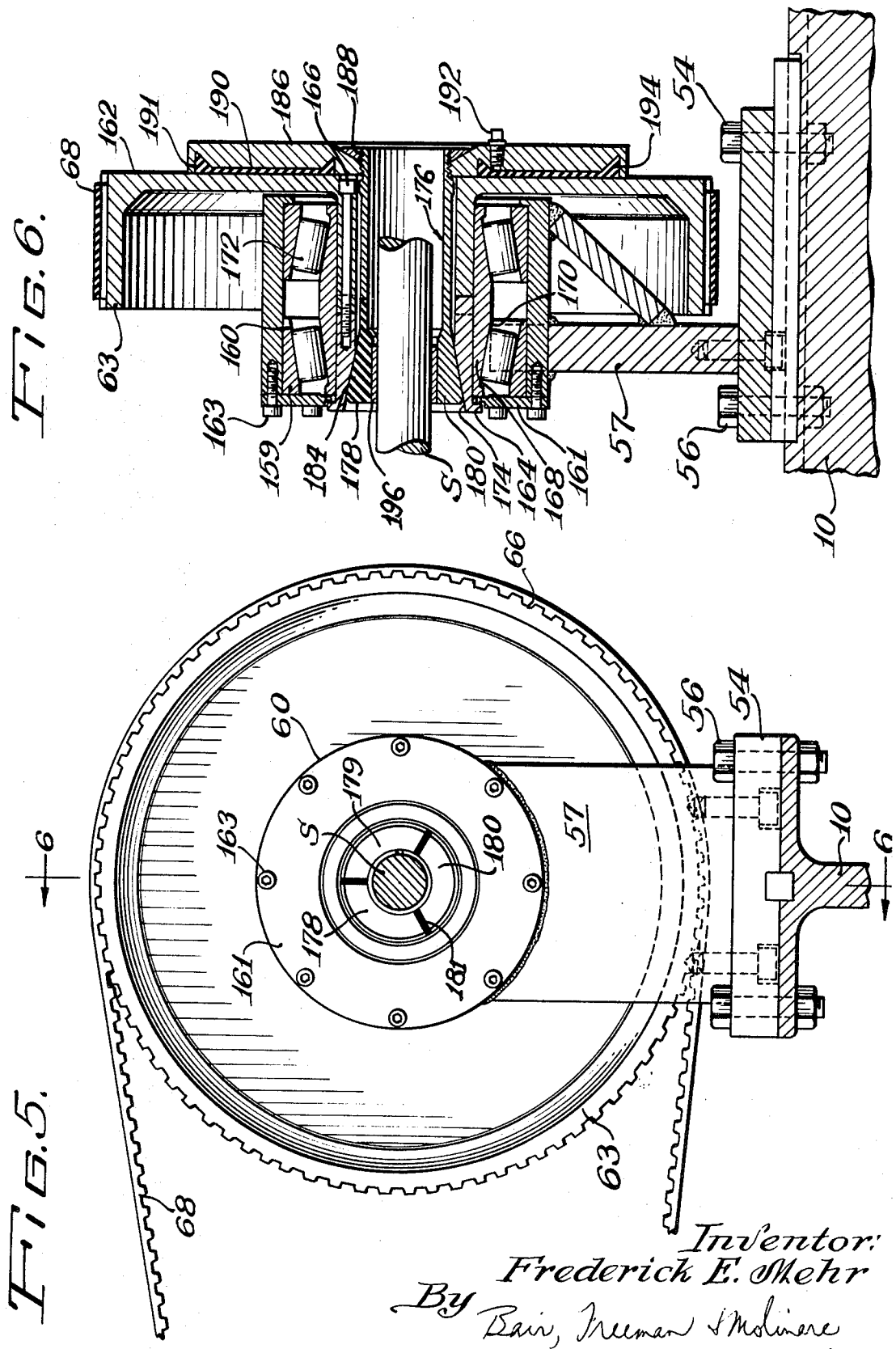

United States Patent Office 3,540,327
Patented Nov. 17, 1970

3,540,327
SPINDLE-LESS LATHE
Frederick E. Mehr, 317 E. 145th St.,
Harvey, Ill. 60426
Filed Nov. 1, 1967, Ser. No. 679,839
Int. Cl. B23b 3/06
U.S. Cl. 82—2      11 Claims

ABSTRACT OF THE DISCLOSURE

A method and apparatus for machining rotating stock. The spindle-less lathe includes a pair of slide units mounted on a slide bed. One of the slide units carries a tool holder for holding a plurality of tools for machining the stock and the other slide unit supports a reinforcing head having back-up rollers which frictionally engage the rotating stock and rotate with the stock to prevent deformation of the stock during machining and pairs of transfer rollers which engage each back-up roller to dissipate the forces acting thereon. The stock is mounted adjacent its ends in a pair of rotatable collet assemblies and is secured in machining position by a set of collet jaws attached to an end of a movable tube in each collet assembly. The collet jaws frictionally secure the stock in the collet assembly when the tube is moved in a longitudinal direction by a fluid operated piston causing the jaws to ride on an inclined seat in the chuck.

Boring apparatus is arranged to longitudinal bore both ends of the stock while it is secured in its machining position. The slide units are moved toward and away from each other by a single fluid powered actuator means to bring the machining tools and back-up rollers into contact with the stock. Nozzle means are provided to direct coolant mist toward the tools and stock. Suction means are provided to remove chips from the stock as they are formed.

BACKGROUND OF THE INVENTION

This invention pertains to a method and apparatus for machining moving stock. In one aspect the invention relates to a spindle-less lathe for performing a number of machining operations rapidly and at a high rate of speed and without repositioning the stock which is being machined. In another aspect, the invention relates to a method for machining stock.

In many instances it is desirable to perform a number of machining operations on a single piece of stock. For example, in the machining of a spool valve, numerous surface cutting operations must be performed on the stock as well as boring the stock from each end along its longitudinal axis.

One prior apparatus required separate tools for performing each of the required multiple surface cutting operations. Each tool was moved separately into engagement with the workpiece or stock to machine same. Moreover, in prior apparatus which is capable of performing one or two simultaneous cutting operations, the stock is frequently deformed by the excessive lateral forces generated by the cutting tools.

Prior apparatus for machining rotating stock generally required repositioning of the stock from its surface machining position to allow for longitudinal boring of the stock ends.

Most prior stock machining apparatus and methods require elaborate readjustment of the apparatus during the course of performing a multiple machining operation on a piece of stock, thus necessitating the expenditure of costly man-hours and down time.

Moreover, prior machining devices utilizing high-speed steel tools were limited in maximum speed at which the operation may be performed due to inadequate cooling of the machine tool and stock and by the interference caused by chips and other machining debris generated during the course of machining.

It is accordingly a principal object of the present invention to provide both method and apparatus for performing multiple machining operations on a piece of stock while minimizing lost time due to readjusting and repositioning the machine and the stock during machining.

Another object of the present invention is to provide both method and apparatus for rapidly securing the stock to be machined such that the stock is firmly held by rotatable chucks or collet assemblies during a multiple surface cutting operation and the ends of the stock can be longitudinally bored without repositioning the stock in the apparatus.

Yet another object of the present invention is to provide an improved spindle-less lathe having a plurality of tools and reinforcing structure to prevent lateral deformation of moving stock due to high lateral forces generated by the tools during machining, while permitting rapid engagement and disengagement of the reinforcing structure and tools from the stock.

A further object of the invention is the provision of both method and apparatus for cooling the machining tools and stock in a spindle-less lathe and for removing chips and other machining debris so as to allow for higher machining speeds.

SUMMARY OF THE INVENTION

In a principal aspect of the invention comprises a spindle-less lathe having a pair of slide units which are simultaneously operated by a single pressure fluid cylinder and piston arrangement. One of the slide units includes a tool holder for holding the machining tool or tools and the other slide unit includes a reinforcing head having rollers to reinforce the stock being machined. The stock is secured in a machining position between the slide units in a pair of collet assemblies which include power operated longitudinally movable collets. When the stock is so secured, the slide units are moved together such that the tool holder, with the machining tools, and reinforcing head, with the rollers, engage the stock for machining.

The collets are constructed to allow boring devices to bore the ends of the stock without necessitating a repositioning of the stock from the machining position.

Cooling means are provided for directing a lubricant mist against the machining tools.

These and other objects, features and advantages of the present invention will be more clearly understood through a consideration of the following detailed description and drawings.

BRIEF DESCRIPTION OF THE DRAWING

Reference hereinafter will be made to the attached drawing, wherein:

FIG. 1 is an elevation view of a presently preferred embodiment of a spindle-less lathe incorporating the principles of the invention;

FIG. 2 is a plan view of the lathe of FIG. 1;

FIG. 3 is a detail view of a multiple tool arrangement and the stock being machined;

FIG. 5 is an elevation view of the collet assembly taken along lines 5—5 of FIG. 2; and FIG. 6 is a cross-section of the collet assembly taken along lines 6—6 of FIG. 5.

DESCRIPTION OF THE PREFERRED EMBODIMENT

Figure 4:
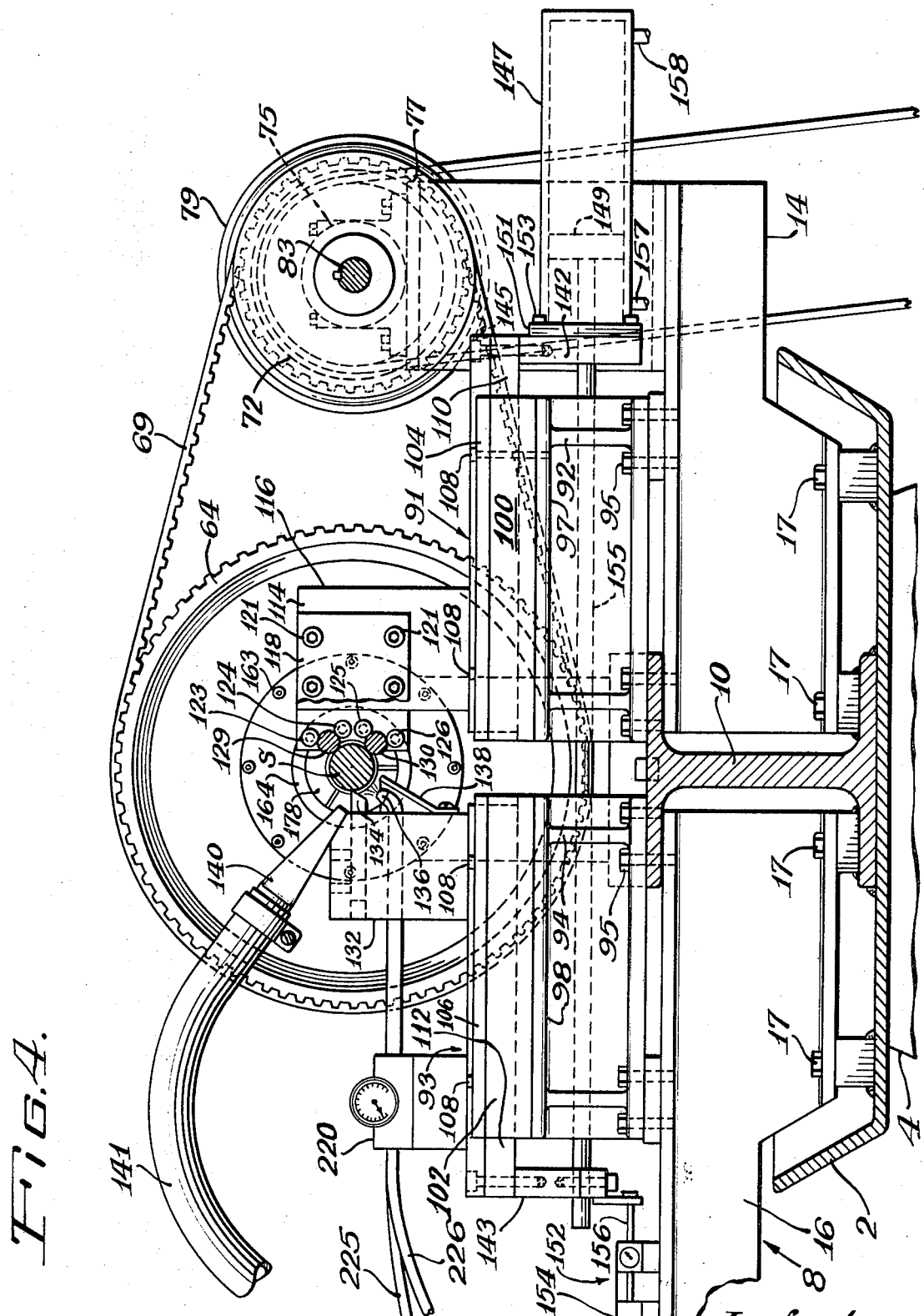
FIG. 4 is a transverse cross-sectional view of the lathe taken along lines 4—4 of FIG. 2.

The apparatus of the preferred embodiment of the invention, as shown in FIG. 1, includes a spindle-less lathe having a lathe bed or frame 8 mounted on legs 4. A collecting pan 2, which has disposed in its bottom a sump 6 for collecting and storing coolant fluid, is mounted on the lathe bed 8. The lathe bed includes long longitudinally extending beams 10 and 12 and short transverse beams 14 and 16. The long I-beams 10 and 12 and the short beams 14 and 16 are fixedly secured in the collecting pan in any suitable manner, for example, as shown in FIG. 4, by bolts 17.

Mounted on long beams 10 and 12 are two pairs of support housing plates 18 and 19. Disposed at the top of each of the support housing plates 18 and 19 are lower slide bed members 20 and 21. Shim members 22 and 23 are disposed above the lower slide bed members 20 and 21 and above the shim members upper slide bed members 24 and 25 are arranged. Each pair of support housing plates 22 and 23 define a housing. The support housing plates 18 and 19, the lower slide bed members 20 and 21, the shim members 22 and 23, and the upper slide bed members 24 and 25 are rigidly held together in sandwiched relation by suitable means, as for example, set screws (not shown) and alignment plates 27 are used initially as an aid in aligning the slides with the frame.

The lower slide bed members or rails 20 and 21 and the upper slide bed members or rails 24 and 25 define a slotted slide groove therebetween within each of which are slidably disposed sliding carriages 26 and 28, respectively. Within the housing defined by support housing plates 18 and 19 are disposed fluid cylinders 34 and 36. In each of fluid cylinders 34 and 36 are disposed pistons 38 and 40 having connecting rods 42 and 44 fixedly attached thereto. Connecting rods 42 and 44 extend through each of the end walls of the fluid cylinders and are fixedly attached to rigid driving members 30 and 32. Rigid driving members 30 and 32 are in turn, fixedly attached to the sliding carriages 26 and 28, respectively. Rigidly joined to the tops of sliding carriages 26 and 28 are boring device carrying members 46 and 48, each of which carries a boring device or drill 50 and 52 respectively.

Also adjustably attached to the long beams 10 and 12 are bases 54 and 55 from which pedestals 57 and 58 extend upwardly. At the top of pedestals 57 and 58 are rigidly attached collet assembly or chuck housings 60 and 61. The rotating portion of the collet assemblies within housing members 60 and 61 are attached to driven pulleys 63 and 64 having teeth 66 and are adapted to rotate with the toothed pulleys. The rotating portion of the chucks is more completely shown in FIGS. 5 and 6 and will be described in more detail later. As shown in FIG. 2, a toothed drive belt 68 and 69 drives each of the driven pulleys 63 and 64, respectively. The drive belts 68 and 69 in turn engage drive pulleys 71 and 72, respectively, which are attached to shaft 83. Shaft 83 is rotatively mounted in bearing journals 74 and 75, which are in turn mounted on platform 77. Platform 77 may be supported independently of the lathe bed or rigidly supported by vertical beam 78 which is rigidly secured to short beam 14 as shown in FIG. 4. Provided on shaft 83 is a clutch 79 which is preferably electrically operated. A double driven pulley 81 drives the clutch 79. Double driven pulley 81 is driven by belts 87 and 88, which are driven by double drive pulley 85. Double drive pulley 85 is driven by motor 90. The chuck assemblies' bases 54 and 55 with their associated collet assemblies may be individually adjusted toward and away from each other along beams 10 and 12, respectively, by loosening their attaching bolts 56.

As shown in FIG. 4, slide units 91 and 93 include a reinforcing head bed 92 and a tool bed 94, which are fixedly supported by short beams 14 and 16, respectively. These beds are attached to their respective short beams 14 and 16 by suitable means, for example, bolts 95 as shown in FIG. 4. Rigidly attached at the tops of beds 92 and 94 are lower slide members 97 and 98. Disposed atop lower slide bed members 97 and 98 are two pairs of vertical side plates 100 and 102, respectively. Mounted atop each pair of vertical side plates 100 and 102, are upper slide bed members 104 and 106, respectively. Lower slide bed members 97 and 98, vertical side plates 100 and 102, and upper slide members 104 and 106 are integrally fixed to each other by bolts 108. The upper slide members 104 and 106 are wider than the vertical side plates 100 and 102 are thick, thus defining a T-shaped slot in each of the slide assemblies 91 and 93. Reinforcing head carriage 110 and tool carriage 112 are slidably disposed in the T-shaped slots.

A reinforcing head, generally 114, is carried on the top of sliding reinforcing head carriage 110 in a T-shaped groove as shown in FIG. 2. The reinforcing head, as shown in FIGS. 2 and 4, includes an upright member 116. Fixedly attached to vertical member 116, as by bolts 121, are a pair of roller carrying plates 118 and 119. Rotatably attached to the inside of each of the roller carrying plates 118 and 119 are four rollers. As shown in FIG. 4, rollers 123, 124, 125 and 126 are attached to plate 119. A corresponding set of four transfer rollers is secured to plate 118, with the upper roller 127 being seen in FIG. 2. An upper long back-up roller 129 is carried between plates 118 and 119 and is arranged to bear against the upper transfer rollers 123 and 124 on plate 119 and the upper two corresponding transfer rollers of plate 118. Also a lower long back-up roller 130 is arranged to bear against the lower plate rollers 125 and 126 of plate 119 and the lower two corresponding transfer rollers of plate 118. The long rollers 129 and 130 extend the full width between plates 118 and 119 and bear against the stock to be machined to reinforce the stock.

Fixed atop the tool carriage 112 in a T-shaped groove 117 is a tool holder head 132 which is adapted to slide with the tool carriage 112. The tool holder head is constructed in a suitable manner to hold machining tools 134 for machining the stock. The tool holder head 132 also carries mist nozzles 136 for directing a fluid mist on the tools 134 and the stock being machined. The tool holder head 132 further carries a mist spray pan 138 to prevent inadvertent damage to the nozzles 136 and prevent the coolant mist from traveling in an inappropriate direction. A section intake 140 is also disposed on the tool holder head 132 for removing chips and other debris resulting from the machining operation.

Rigid extensions 142 and 143 depend downwardly from the outward ends of reinforcing head carriage 110 and tool carriage 112, respectively. The extensions 142 and 143 are rigidly attached to their respective carriages as by bolts 145. A pressure fluid cylinder 147 having a piston 149 therein is rigidly attached to rigid extension 142 by its cylinder end block 151. Cylinder end block 151 may be attached by any suitable means to extension 142, for example, as by bolts 153. The rod 155, connected to the piston 149, extends through cylinder end block 151 and rigid extension 142 and is fixedly attached to rigid extension 143 on the tool carriage 112. Fluid lines 157 and 158 at each end of cylinder 147 introduce and exhaust a pressurized fluid from the cylinder.

Also rigidly attached to the tool carriage rigid extension 143 is a damping feed unit 152 having a dash pot type damping chamber 154 and worm screw 156 for controlling the movement to the right, as viewed in FIG. 4, of the tool carriage 112 and its associated tool holder head 132 and machining tools 134 during the machining of the stock. The specific construction of the damping feed unit is not a part of the instant invention and will not be further described.

With reference to FIGS. 5 and 6, the pair of collet assemblies will now be described. It should be remembered that the description hereinafter will be drawn to one of the two collet assemblies, the second collet assembly being a mirror image of the collet assembly described. The chuck or collet assembly housing 60 is stationarily mounted on pedestal 57. The chuck housing 60 includes stationary insert assembly 159 having a plurality of stationary inclined surfaces 160. The pulley 63 includes a flat faced plate 162, the plane of which is perpendicularly disposed to axis of the workpiece. The flat faced plate 162 is circular and includes an opening at its center. Disposed perpendicularly to the plane of the circular face 162, is a tubular extension 164, which extends into the collet assembly housing 60. The tubular extension 164 is rigidly fixed to the flat faced plate 162 in any suitable manner and, for example, by bolts 166, as shown in FIG. 6. Rigidly attached to the tubular extension 164 about its outer periphery is a member 168 having a plurality of inclined faces 170 which are adapted to rotate with the tubular extension 164. Disposed between the stationary inclined surface 160 and the rotatable inclined face 170, are a plurality of roller bearings 172. The tubular extension 164, at its end opposite flat face of plate 162, is tapered such that its diameter increases as the distance from plate 162 increases thus forming an inclined collet seat 174. A tube 176 is disposed within tubular extension 164. The tube 176 is of increased thickness toward its end adjacent the collet seat 174 and the thicker portion of the tube is split longitudinally over part of its length, thus forming three collet jaws 178, 179 and 180. The increase of thickness of tube 176 is gradual and thus forms an inclined surface 184 on each of the collet jaws 178, 179 and 180. This inclined surface 184 generally conforms with the incline or taper of the collet seat 174. The slots 181 between the collet jaws are preferably filled with a flexible resilient synthetic material such as "Flexane," which is available from Devcon Products. The resilient material assists in releasing the collet jaws when it is desired to remove the stock from the jaws. A plate 161 is secured to the chuck housing 60, as by bolts 163 and secures the insert 159, bearings 172 and rotating member 68 in the housing.

The tube 176 extends longitudinally from the collect jaws 178, 179 and 180 toward and past the flat face 162. Disposed on this extended end of the tube, is a piston member 186 which is preferably threadedly attached at 188 to the tube 176. A face of the piston 186 forms a piston cup 190, which cooperates with the flat face 162 to define a fluid chamber. The piston 186 includes a fitting 192 for introducing fluid to the chamber. The chamber is filled with a deformable synthetic or like plastic material 194 such that when pressurized fluid is introduced through fitting 192 to the chamber, the material 194 is deformed against the flat face 162 and into the grooved portions 191 of the cup, to form a seal and prevent the escape of fluid around the edges of the piston 186. When pressurized fluid, for example air, is introduced to the chamber formed between flat face 162 and piston 186, the piston is driven to the right a slight amount, as viewed in FIG. 6, while the flat face 162 remains stationary. The piston movement thereby draws tube 176 to the right with its associated collet jaws 178, 179 and 180. As the collet jaws move to the right, they are urged inward toward the stock S by the wedgelike action of the inclined surfaces 184 of the collet jaws riding along the inclined collet seat 174. To protect the stock S, the collet jaws may include resilient pads 196 disposed between them and the stock S.

Referring again to FIG. 1, the elements of the pressurized fluid system will now be described. Pressurized fluid, preferably air, is introduced into the system from a compressed air source or line through incoming air line 200 into a multiway valve 202. The specific details of the multiway valve are not shown since such details form no part of the present invention. The multiway valve 202 is controlled by handle 204 to distribute air to or receive the exhaust from any one of the pressurized fluid cylinders as hereinbefore described. For example, the valve may control the flow of air through lines 157 and 158 to the pressurized fluid cylinder 147 of the tool and reinforcing head assemblies. The flow of pressurized fluid to the boring device fluid cylinder 34 may be controlled through lines 206 and 207. Also, pressurized fluid flow to the boring device cylinder 36 may be controlled by valve through lines 209 and 210. Pressurized air may also be tapped off of air line 200 before valve 202 and led via lines 212 and 213 to the coolant mist forming chamber 220 or via line 192 to the collet piston cups.

To enable the apparatus of this invention to operate at a high sped in performing its machining operation and to avoid the presence of excessive coolant liquid and debris during machining, an improved coolant and cleaning arrangement has been provided. As shown in FIG. 4, coolant collects in a storage sump 6. A coolant suction pump 215 has a suction line 217 extending into sump 6. The suction pump 215 draws coolant through its suction line 217 and delivers the coolant to a manifold 219 through the pump discharge line 218. From the manifold 219 coolant liquid passes through lines 222 and 223 to a coolant mist forming chamber 220. In the mist forming chamber air, entering through lines 212 and 213, is regulated and mixed with the coolant liquid to form a mist and the mist mixture passes through lines 225 and 226 to the mist directing nozzles 136 as shown in FIGS. 2 and 4. The mist directing nozzles 136 are located adjacent to the machining tools 134 and the outlets of the nozzles are aimed to direct the coolant liquid mist toward the machining tools 134 and the stocks being machined at a point on the moving stock immediately following its engagement with the machining tools 134. A suction intake 140 is directed at a point on the stocks immediately preceding that point entering into engagement with the machining tools 134 to remove chips formed during machining. Line 141 is connected to a suitable suction producing apparatus (not shown) to form a suction in the intake 140.

Coolant liquid may also be directed from manifold 219 to each of the boring device carrying members 46 and 48 and their associated boring devices or drills 50 and 52, respectively, for cooling the drills and stock during the boring operation.

Due to the improved cooling and suction arrangement and the reinforcing construction of the present invention, the spindle-less lathe of this invention is readily adapted to perform a multiple simultaneous machining operation. As is shown in FIG. 3, the stock S is being simultaneously cut by a plurality of machining tools 134, 134', 134" and 134'''. Moreover, because of the open ended collet arrangement as shown in FIGS. 5 and 6, both ends of stock S may be bored by the boring members 50 and 52 to produce longitudinal bores B, as shown in FIG. 3, without repositioning the work from its machining position.

The operation of the preferred embodiment of the invention is as follows:

Prior to beginning the machining operation, the boring device carrying members 46 and 48 are withdrawn as far to the right and left, respectively, as possible, when viewing FIG. 1. Also, the reinforcing head carriage 110 and the tool carriage 112 and their associated reinforcing head 114 and tool holder head 132 are retracted to their farthest right and left paths of travel, respectively, when viewing FIG. 4. The workpiece or stock S to be machined, is then inserted into the chuck or collet jaw assemblies as shown in FIGS. 5 and 6. The stock S may be inserted through the collet assemblies either from the right or the left, as viewed in FIG. 2. If, for example, the stock is inserted from the right, the end of the stock will, in succeeding order, pass the piston 186, tube 176 and the collet jaws 178, 179 and 180 of the right hand collet assembly; will pass between the retracted reinforcing head 114 and tool holder head 132, and into the left hand collet assembly past its corresponding collet jaws, tube and, if desired, the left hand assembly's piston. The stock S is then adjusted longitudinally in the collet assemblies to the desired machining position. Either, or both, of the collet assemblies may be adjusted toward or away from each other to provide for stock of varying length by merely loosening bolts 56 and repositioning either or both bases 54 and 55 along beams 10 and 12, respectively. Of course, it is not necessary that the stock protrude from either end of the assemblies past their associated pistons but need only extend as far as the respective collet jaws of the assemblies so that the stock may be firmly held by each of the collet jaws. Pressurized air is then introduced through the pressure fluid fittings 192 and into the piston cup 190 of each of the collet assemblies. The air pressure forces the deformable material 194 against the flat face 162 sealing the air into the cup 190. Flat face 162 being stationary, the piston member 186 is forced to the right as viewed in FIG. 6. The piston member 186, being threadedly connected at 188 to the tube 176, also draws the tube to the right. As the tube 176 is drawn to the right, collet jaws 178, 179 and 180 which are integrally part of tube 176 also drawn to the right and are driven inwardly against the stock S. This is due to the wedge-like effect caused by the inclined surface 184 of the jaws riding along the inclined collet seat 174. Thus, the stock is firmly gripped in its machining position.

Drive motor 90 is started to rotate the double drive pulley 85, belts 87 and 88 and driven pulley 81 at a desired speed for machining. Clutch 79 is engaged, preferably electrically, and thereby drives shaft 83, drive pulleys 71 and 72, toothed belts 68 and 69, and toothed driven pulleys 63 and 64. The toothed driven pulley of the collet assembly, being rigidly attached to face plate 162, rotates face plate 162, the dependent tubular flange 164, the collet seat 174, collet jaws 178, 179 and 180, the tube 176 and the piston member 186. The stock S, which has been firmly clamped between the collet jaws 178, 179, and 180, is also thereby rotated.

When the stock to be machined is up to the desired rotational speed, pressurized air is introduced through line 200 to valve 202. From the valve the air is distributed to air line 157 and thereby to the left hand side of piston 149, as shown in FIG. 4. This air pressure exerts a force both tending to urge piston 149 to the right and tending to urge cylinder end block 151 to the left. If the piston 149 were held stationary, the force exerted on cylinder end block 151 would push the end block 151, the rigid extension 142 and thereby the reinforcing head carriage 110 to the left. Since, however, the piston 149 is also movable, as the end block 151, extension 142, and carriage 110 move to the left, the piston 149 will simultaneously move to the right. Thus, rod 155 is also drawn to the right, as well as rigid extension 143 and its associated tool carriage 112. Therefore, when pressurized air is introduced through line 157, the two slide assemblies with their associated rigidly fixed elements will tend to move together toward the stock S which has been disposed between the tool holder and reinforcing heads and perpendicular to the direction of the slide assembly. To prevent severe impact of the reinforcing head and tools with the stock resulting from too rapid movement of the carriages 110 and 112 toward each other, a damping unit 152 is rigidly attached to the rigid extension 143 which acts to dampen rapid movement of the slide assemblies toward each other. The damping unit 152 commences its damping action just prior to the engagement of the stock S and the tools 134 as the slide assemblies are moving together. During the machining of the surface of the stock S, pressure continues to be admitted through line 157 tending to continue to urge the tool carriage 112 and its fixedly attached tool holder head 132 and tool 134 into the rotating stock S to machine the surface of the stock. The rate at which the tool 134 is fed into the stock S is controlled by the damping action of the damping unit 152.

As shown in FIGS. 1 and 2, a mist coolant nozzle 136, fixed to the tool holder head 132, is urged toward the rotating stock as the slide assemblies are urged together. Pump 215 draws coolant from sump 6 through its suction line 217 and delivers the coolant, through its discharge line 218 to the coolant manifold 219. Coolant liquid is then distributed from the manifold 219 through lines 222 and 223 to the mist forming chamber 220. Air from the incoming air line 200 is also delivered, via lines 212 and 213, to the mist forming chamber 220. The air so delivered, is throttled as desired to produce the appropriate desired pressure of air entering the mist forming chamber 220. The air and coolant liquid are mixed together in the mist forming chamber 220 to produce a coolant mist which then passes through lines 225 and 226 to the "Chilcut" units 228 from whence it is regulated and distributed to the mist nozzles 136. The nozzles 136 direct a spray of coolant mist toward the rotating stock S being machined and the machining tools 134 at a point where the rotating work just leaves the machining tool 134. A suction intake 140 is also attached to the tool holder head 132 and is therefore also urged toward the rotating stock S when the slide assemblies are urged together. Suction intake nozzle 140 is connected via line 141 to a suitable suction producing apparatus. Suction intake 140 draws suction on the stock S being machined at a point just prior to its entry into engagement with the machining tool 134 to remove chips and other machining debris and prevent fouling of the tool and damaging of the surface of the stock S being machined.

As the slide assemblies and their associated carriages 110 and 112 are drawn together, the reinforcing assembly is also brought to bear against the rotating stock S. The vertical member 116, being fixedly attached to the reinforcing head carriage 110, is urged to the left as shown in FIG. 4 when pressurized air is admitted through line 157 to the pressure cylinder 147. As the vertical member 116 moves to the left, its associated roller carrying plates 118 and 119 are also moved to the left as well as their associated rollers 123, 124, 125, 126, 127, 129 and 130. These rollers are moved to the left until long back-up rollers 129 and 130 are brought to bear against the rotating stock S. As tool 134 is fed into the stock during the machining operation, a force is exerted against the stock in a generally right hand lateral direction, as viewed in FIG. 4. Without the reinforcing structure, the stock during machining would tend to deform to the right as viewed in that figure. However, with the reinforcing structure of the present invention, the lateral force is absorbed by the back-up rollers 129 and 130 which are angularly offset above and below the laterally directed force created by the machining tool 134. Preferably, rollers 129 and 130 are offset 90° with respect to each other and are equidistantly spaced above and below a horizontal plane through the point of engagement of the tools on the stock. The overall laterally directed force caused by the machining tool is thereby broken down into two components: an upward, angularly directed component through long back-up roller 129 and a downward, angularly directed component through long back-up roller 130. The component force directed to the long roller 129 is further broken down into resultant components through the upper pair of transfer rollers 123 and 124 on plate 118 and the corresponding pair of upper transfer rollers on plate 119. Similarly, the component force directed through long back-up roller 130 is further broken down into resultant components through the lower pair of transfer rollers 125 and 126 on plate 118 and the corresponding pair of lower transfer rollers on plate 119. Preferably, the pair of transfer rollers cooperating at each end with a back-up roller are offset 90° with respect to each other. Thus, multiple surface machining operations, as shown in FIG. 3 may be simultaneously carried out through the use of a number of tools without resulting deformation of the stock S during the machining operation. Without the reinforcing structure of the present invention, the length of the workpiece and the number of simultaneous cutting operations which may be performed would be limited by the excessive lateral forces which tend to deform the stock.

Since the manner of clamping stock S in the collet jaws 178, 179 and 180 leaves the full cross-sectional area of stock S exposed at each of its ends, the stock may be longitudinally bored without repositioning the stock from its previously described machining position. To perform the boring operation, pressurized air is admitted from valve 202 through lines 207 and 210 to the right and left hand sides of pistons 38 and 40, respectively, as shown in FIG. 1. Piston 38 is thereby forced to the left and piston 40 to the right. Movement of piston 38 to the left also drives its associated connecting rod 42 and rigid driving member 30 to the left. Movement of piston 40 to the right, drives its associated connecting rod 44 and rigid driving member 32 to the right. As driving member 30 is moved to the left and driving member 32 to the right, sliding carriage 26 and sliding carriage 28 are also carried to the left and right, respectively, as well as their associated boring device carrying members 46 and 48. As boring device carrying member 46 moves to the left, its associated drill 50 also moves to the left and enters the stock S thereby longitudinally boring the stock along its axis. The same result obtains as drill 52 moves to the right into the stock. Either one or both of the boring devices may be employed to conduct the boring operation as desired. The drills 50 and 52 may be stationary and rotation of the stock may be utilized to perform the boring operation. If desired, the boring operation may be performed while the machining of the stock's surface is also being performed by tools 134 or the boring operation may be conducted before or after the machining operation. Also, if desired, the drills 50 and 52 may rotate while performing their boring operation. To cool the drills 50 and 52 during the boring operation, coolant liquid is directed from coolant manifold 219 through lines 230 and 231 to the boring device carrying members 46 and 48 and their associated drills 50 and 52. The drills are preferably hollow to provide for the flow of coolant therethrough.

Higher speeds of rotation of the workpiece or stock are possible through use of the present invention. Normally, the stock is rotated at about 150 r.p.m. Carbide tooling could be used for higher speeds, but such tooling is prohibitively expensive in many cases. The present invention utilizes less expensive high speed steel tools at spindle speeds on the order of 750–1200 r.p.m. In one instance, sixteen separate machining operations (including boring each end) were performed simultaneously, on a valve spool about twelve inches long within one minute.

It is to be understood that the embodiments of the method and apparatus of the invention which have been described are merely illustrative of an application of the principles of the present invention. Numerous modifications may be made by those skilled in the art without departing from the true spirit and scope of the invention.

I claim:
1. Apparatus for machining rotating stock comprising: collet means for holding the stock in a position to be machined,
a pair of slide units movable toward and away from each other,
a tool holder mounted on one of said slide units for holding tool means for machining the stock,
reinforcing means on the other slide unit mounted to bear against the stock when said slide units are moved toward each other to prevent deformation of the stock during machining, the tool holder and reinforcing means being disposed on opposite sides of said stock, and
power operating means connected to said slide units for moving said slide units and their respective tool holder and reinforcing means simultaneously toward and away from one another, said reinforcing means comprising back-up roller means for bearing against and frictionally rotating with the rotating stock being machined when said pair of slide units are drawn together and transfer roller means for dissipating the force applied to the back-up roller means.

2. The apparatus of claim 1 including means to dampen movement of the tool holder toward the rotating stock being machined.

3. The apparatus of claim 1 wherein the transfer roller means include a pair of rollers that are offset 90° with respect to one another and bear against an associated back-up roller means.

4. The apparatus of claim 1 wherein said power operating means includes a fluid cylinder adapted to receive a pressurized fluid, said fluid cylinder being fixedly attached to one of said slide units,
a movable piston disposed in said fluid cylinder,
a connecting rod fixedly attached at one end to said piston and at the other end to the other of said slide units,
whereby when the pressurized fluid is introduced to one side of said movable piston, said slide units are moved in a direction toward each other and when the pressurized fluid is introduced to the other side of said piston, said slide units are moved in a direction away from each other.

5. The apparatus of claim 1 wherein said power operating means include fluid cylinder means and control means to actuate said fluid cylinder means to move said slide units relative to one another.

6. The apparatus of claim 1 wherein one of said slide units includes
suction means for removing chips as they are formed on the surface of the stock being machined at one side of said tool means, and
nozzle means for directing a coolant mist against the tool and stock being machined on the opposite side of said tool means with respect to the direction of rotation of said stock.

7. The apparatus of claim 1 wherein said collet means comprises:
a body member having a longitudinal channel therethrough,
a collet seat at one end of the channel having an inclined surface formed by increasing the width of said channel from a point intermediate its length toward said one end,
a longitudinal tubular member open at each of its ends extending through said channel, said tubular member being longitudinally movable,
collet jaws integrally formed on said tubular member adjacent said collet seat and substantially conforming to said inclined surface, and
urging means adjacent the other end of said channel to move said tubular member in a longitudinal direction toward said other end of said channel.

8. The apparatus of claim 1 wherein the collet means include a pair of collets for engaging the stock to be machined on the exterior surface thereof adjacent the ends, at least one collet being adjustable toward and away from the other to accommodate stock of different lengths.

9. The apparatus of claim 7 wherein the urging means comprises a face plate on said body member adjacent said other end, and a piston cup, said piston cup and said face plate defining a chamber which is adapted to receive pressurized fluid for moving said tubular member and said body member relative to each other.

10. The apparatus of claim 9 wherein said piston cup is fixedly attached to said tubular member to move said tubular member in said longitudinally direction while said body portion remains stationary.

11. The apparatus of claim 10 wherein said piston cup is threadedly engaged on said tubular member.

References Cited

UNITED STATES PATENTS

| | | | |
|---|---|---|---|
| 735,254 | 8/1903 | Hartness | 82—35 XR |
| 1,293,096 | 2/1919 | Holt | 82—2.5 |
| 2,377,383 | 6/1945 | Slovak | 82—2.5 |
| 2,526,487 | 10/1950 | Kurzweil et al. | 82—35 XR |
| 2,559,360 | 7/1951 | Kurzweil | 82—24 XR |
| 2,837,972 | 6/1958 | Knowles | 82—34 XR |
| 3,205,737 | 9/1965 | Ogren | 82—2.5 |

LEONIDAS VLACHOS, Primary Examiner

U.S. Cl. X.R.

29—27, 558; 82—35; 279—4